United States Patent
Mishra et al.

(10) Patent No.: US 10,417,718 B2
(45) Date of Patent: Sep. 17, 2019

(54) DIGITAL MANUFACTURING SYSTEM

(71) Applicant: Accenture Global Services Limited, Dublin (IE)

(72) Inventors: Prangya Mishra, Bangalore (IN); Sudhakar Reddy, Bangalore (IN); Manish Krishna Pingale, Bangalore (IN); Subash Chandra Rout, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 320 days.

(21) Appl. No.: 15/067,905

(22) Filed: Mar. 11, 2016

(65) Prior Publication Data

US 2016/0275628 A1    Sep. 22, 2016

(30) Foreign Application Priority Data

Mar. 16, 2015  (IN) .......................... 1299/CHE/2015

(51) Int. Cl.
*G06F 11/07* (2006.01)
*G06Q 50/04* (2012.01)
*G06Q 10/10* (2012.01)

(52) U.S. Cl.
CPC .......... *G06Q 50/04* (2013.01); *G06Q 10/103* (2013.01); *Y02P 90/30* (2015.11)

(58) Field of Classification Search
CPC ........................................................ G06F 11/07
USPC .............................................................. 714/2
See application file for complete search history.

(56) References Cited

U.S. PATENT DOCUMENTS

2010/0083029 A1*  4/2010  Erickson ............. G06F 11/0709
                                                              714/2

* cited by examiner

*Primary Examiner* — Jason Lappas
(74) *Attorney, Agent, or Firm* — Mannava & Kang, P.C.

(57) ABSTRACT

A digital manufacturing system collects data from manufacturing plants, users, applications and business processes associated with a manufacturing enterprise. Anomalies in the collected data are detected and automated actions based on rules such as affecting the operation of the machines or sending messages to responsible parties are executed. The events that occur in response to the automatic actions are logged to a data warehouse for subsequent study and analysis.

18 Claims, 9 Drawing Sheets

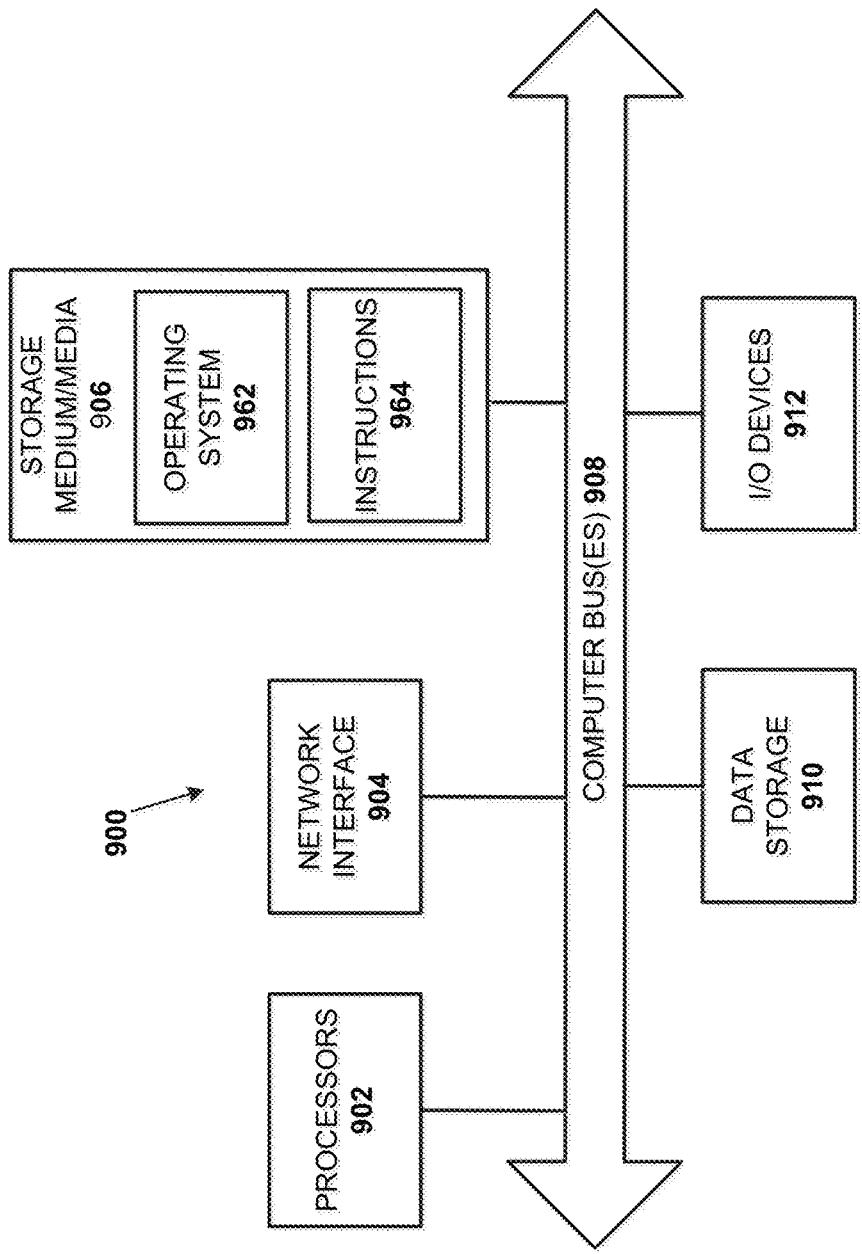

DIGITAL MANUFACTURING SYSTEM

PRIORITY

This application claims priority to Indian Provisional Patent Application Serial No. 1299/CHE/2015, filed on Mar. 16, 2015, and entitled "Digital Manufacturing System", the entirety of which is incorporated herein by reference.

BACKGROUND

Manufacturing, whether it is for commodities, pharmaceuticals, consumer goods, etc., often involves controlling complex machines and processes. Many large manufacturers currently use or are investing in various technologies, such as smart sensors, predictive analytics, and big data functionality, to manage and improve their manufacturing processes. For example, enterprises are moving from a hub and spoke enterprise architecture to a true service oriented architecture. Although manufacturers may be currently implementing or investing in new technologies to control complex machines and processes, these technologies and legacy technologies may not be designed for: collaboratively solving day-to-day, manufacturing, operational issues; maintaining supplier and customer relationships; and harvesting and enriching an operational knowledge base which may be used to improve manufacturing processes. Furthermore, companies may move in the direction of focusing on core competencies and move manufacturing support functions to outsourcing partners. In these instances, existing platforms may not be designed to collaborate with outsourcing partners to facilitate quick and easy resolution to day-to-day manufacturing problems and improvement of manufacturing processes in the long term.

BRIEF DESCRIPTION OF DRAWINGS

The embodiments are described in detail in the following description with reference to the following figures. The figures illustrate examples of the embodiments.

FIG. 9 illustrates a computer system that may be used for the methods and systems described herein.

DETAILED DESCRIPTION OF EMBODIMENTS

Figure 1:
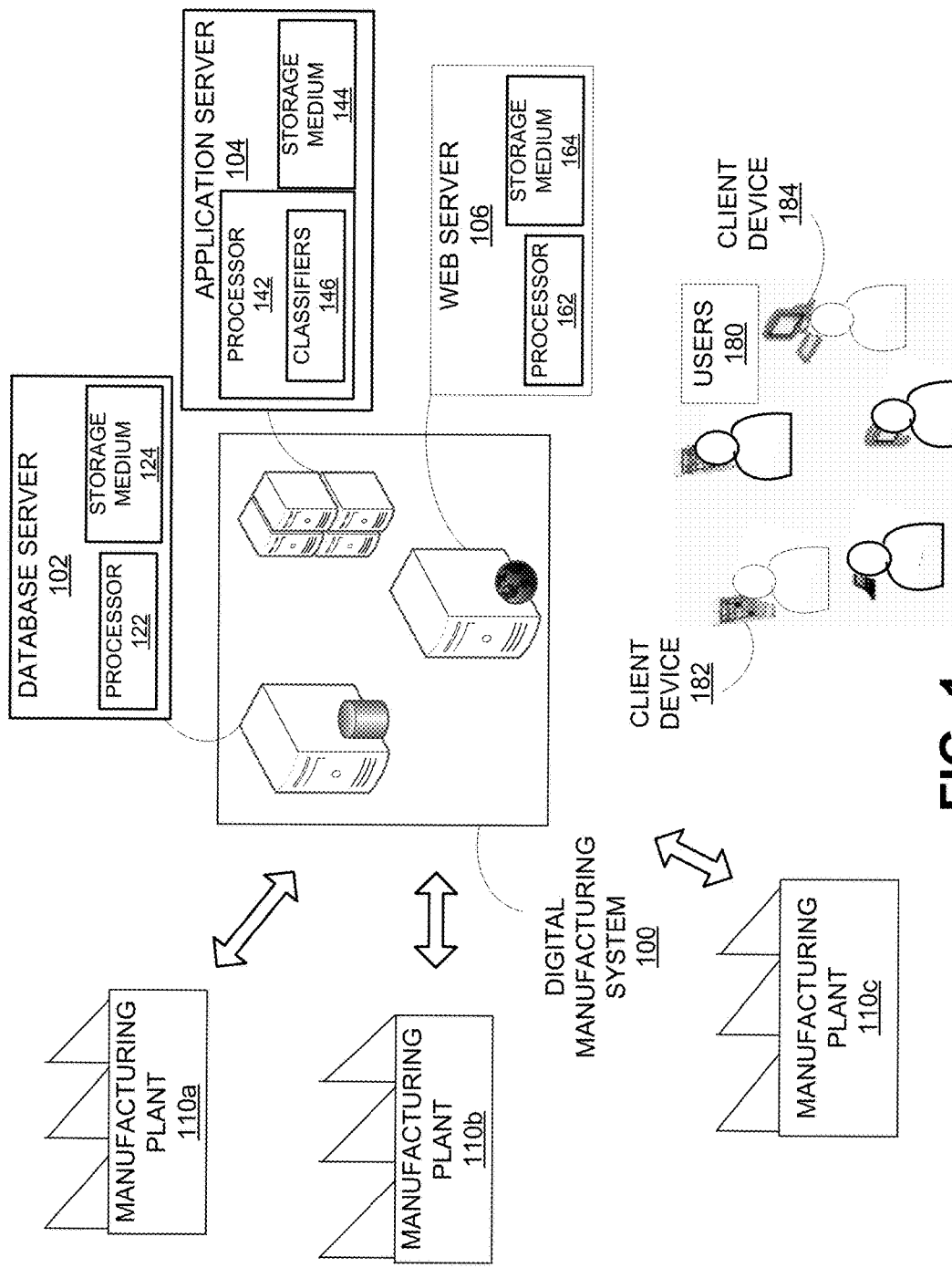
FIG. 1 illustrates one example of the digital manufacturing system.

For simplicity and illustrative purposes, embodiments are described by referring mainly to examples thereof. Also, numerous specific details are set forth in order to provide a thorough understanding of the embodiments. It will be apparent however, to one of ordinary skill in the art, that the embodiments may be practiced without limitation to one or more of these specific details. In some instances, well known methods and structures have not been described in detail so as not to unnecessarily obscure the description of the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

Modern day collaboration platforms for the manufacturing sector involve interactions between various entities including human users and machines. Many machines including electrical and mechanical equipment like motors, transportation systems, heavy vehicles, electronic hardware like sensors, robotic appliances, monitoring hardware, PLCs and computers executing various proprietary industrial and user applications are controlled by and work alongside human beings in successfully delivering goods and services. While the machines provide precision and reliability, the human users are expected to supply the intelligence and intuition for the proper functioning of the manufacturing systems involving human, analog and digital entities.

Smooth communications between the various entities therefore enables the entities to work in tandem to thereby ensuring reliability. A myriad of communication tools, such as emails, text messages, instant messages (IMs), telephone calls, blogs, message boards and the like exist which can help with the collaboration across large manufacturing establishments with manufacturing plants and sites scattered throughout the globe. While the collaboration platforms for such global concerns are expected to provide the advantages associated with the entities, like reliability and precision from machines and reasoning and intuition from human users, they can also malfunction due to the weaknesses of the same entities. For example, many communication tools require voluntary actions from the users to initiate collaboration. For example, if a machine malfunctions, it may necessitate the user to manually browse through the activity log of the machine to identify the problem. If such voluntary actions are not executed in time, it can result in a disruption to the manufacturing or service goal. Thus, unreliability may creep in when a user does not promptly execute a voluntary action. Moreover, many collaboration platforms are not enabled to record the interactions between the various entities that precede a particular decision. In some instances, the communication tools may not be available on a chosen device of a particular user.

According to one or more of examples described herein, a collaboration platform for digital manufacturing system, including but not limited to large scale commercial applications, is disclosed. The digital manufacturing system facilitates communication, data sharing and other forms of collaboration for the various entities involved in the manufacturing processes. The system converges aspects of an enterprise including people, processes, technology, data and physical things onto a single platform. This convergence facilitated by the digital manufacturing system can lead to an environment for manufacturing organizations where cyber and physical entities can interact in real-time, and systems and devices can be loaded with information and can deliver it to another system in order to trigger rule-based "smart events". The digital manufacturing system not only allows human users connected with the platform to exchange messages but also captures data (both structured and unstructured) during an operation cycle. The messages and data may thus be shared between entities connected with the collaboration platform. The entities, including the users and machines, across and beyond the enterprise, can receive messages arising from actions triggered by the smart events. The data and the messages may also be shared for crowd sourcing.

The digital manufacturing system may utilize big data analytics, machine learning, predictive modeling, complex event processing of structured and unstructured data and integration with other existing collaboration tools to serve as an industrial strength backbone for intelligent decision making, automatic knowledge creation and archiving, front office tool for a remote operations center (ROC) aimed at improving safety, increasing reliability of operations, and improved products. In an example, activity logs are accessed and their data is examined to automatically recognize anomalies which can cause smart events to occur. Activity logs can be logs associated with the various pieces of equipment connected to the digital manufacturing platform that include entries for operations carried out by the respective equipment. Anomalies can include those entries in the databases connected with the digital manufacturing system that are out of expected ranges for a given data set. Artificial Intelligence tools such as but not limited to trained classifiers may be employed to recognize such anomalies. The classifiers can be provided with training data obtained from large data archives in order to determine the expected ranges thereby recognizing the anomalies. The smart events can include one or more of automatic actions determined by rules. The rules determine how the digital manufacturing system should respond to different events. The automatic actions include affecting the operation of the machines and triggering message delivery to automatically selected recipients who can respond to the anomalies. The messages may include information regarding the anomaly and may be formatted with one or more of context data, mark up or other formatting text in order to be optimally displayed in a user interface. In an example, messages may be entries posted in a user's subscribed feed. As the anomalies are resolved, the various interactions occurring on the digital manufacturing system during the resolution may be recorded in large knowledge databases for future reference.

In order to operate on a global scale, the digital manufacturing system may interact with at least one manufacturing plant and a set of other applications which are either already existing within the plant application landscape or if they don't exist, they can be offered to users in the form of software as a service. The digital manufacturing system may include applications operating in a service oriented approach. The applications can be chosen based upon the requirement of the user.

Technical advantages that may be achieved by the digital manufacturing system may include effective and real-time enterprise level collaboration between smart sensors, industrial Internet of things (IIoT) as a service, and people. The digital manufacturing system provides for a centralized platform to trigger smart and predictive events that invoke rule-based action items for systems and responsible people to act upon. Events may be contextualized to create and archive a knowledge base. Predictive tagging may be performed on information in the knowledge base, people, processes and smart events. Unified and real-time collaboration between users inside and outside of organization is enabled through user interfaces of the digital manufacturing system. The digital manufacturing system may provide a connection to social media applications for crowd sourcing, supplier management and customer relationship management. Customized user interface may be made available to each user of the digital manufacturing system to interact with the various entities. The user interfaces may provide a real-time view of plant operations at appropriate detail, and the digital manufacturing system includes assisted and smart decision making applications for planning and execution. The user interfaces may include a front office tool for a remote operations center and other enterprise applications in a mobile, wearable and standard desktop environment.

FIG. 1 shows one example of the digital manufacturing system 100 which is connected to multiple manufacturing plants, such as manufacturing plants 110*a-c*, that may be geographically dispersed. The digital manufacturing system 100 is a platform that allows man and machine to collaborate and communicate to monitor the manufacturing plants 110*a-c*. The digital manufacturing system 100 may include one or more servers, such as but not limited to, the database server 102, the application server 104 and the web server 106 that interact with the systems of the manufacturing plants 110*a-c* and enterprise applications, the client devices 182, 184 of the users 180 and other internal and external systems. The manufacturing plants 110*a-c* may include hardware or machines such as but not limited to motors, transportation systems, heavy vehicles, processors such as Programmable Logic Controllers (PLCs), smart sensors such as industrial sensors for sensing temperature and other conditions, an audio sensor that measures motor noise to detect frequencies that are indicative abnormal operation and the like.

The data emitted by the various machines and other hardware of the manufacturing plants 110*a-c* and computers such as the client devices 182, 184 may be stored in activity logs associated with the respective hardware equipment. Instructions stored in a storage medium 144 of the application server 104 may cause the processor 142 to access the activity logs. The data may be high-volume, time-series data and low volume data. The activity logs may also include structured data which includes additional context information such as the source of the data, unstructured data which may not include the additional context information. In addition, Structured Query Language (SQL) data from relational databases and data from user-based applications executing on the server and client machines throughout the enterprise can also be accessed.

The processor 142 of the application server 104 can execute instructions retrieved from the storage medium 144 to analyze the data from the various activity logs and identify anomalies which are used to trigger "smart events". The smart events can be associated with rules that enable execution of automatic actions such as shutting off an equipment or executing other safety procedures, automatically identifying parties responsible for the equipment whose data includes the anomalies and transmitting messages to the responsible parties with the hardware element associated with an anomaly identified as the sender, storing events and interactions resulting from the smart events on the digital manufacturing system 100 to a knowledge base on the database server 102 for archival purposes and the like. Thus, users 180 and machines may act as message senders and post messages to a user's message stream on the digital manufacturing system 100.

The processor 142 can employ artificial intelligence (AI) techniques to recognize anomalies in accordance with one example. Anomalies can include data entries that are out of a predetermined range for a given data set. Recognition of the anomalies can be achieved via trained classifiers 146 in an example. Training data for the classifiers 146 can be obtained from sources of big data that store historical machine logs of the manufacturing plants 110*a-c*. In an example, the processor 122 of the database server 102 may retrieve the activity logs and store them in a storage medium 124 and make them available for training purposes. The activity logs may include structured and unstructured data of the manufacturing equipment. In an example, the training data can be a labeled data set and hence train the classifiers 146 via supervised learning. In another example, the classifiers 146 may be trained via unsupervised learning.

When an anomaly is recognized, the processor 142 can further identify parties in charge of handling the particular equipment associated with the anomaly. In an example, the responsible parties can be users or machines that execute automatic safety procedures. The responsible parties are automatically tagged in response to an event arising due to the anomaly. Accordingly, the application server 104 can communicate with the web server 106 in order to send out messages to the responsible parties. A non-transitory storage medium 164 of the web server 160 can include instructions that are executed by a processor 162 of the web server for sending out messages. In an example, the messages can be displayed in user interfaces that are customized to particular users and formatted to be properly displayed across different client devices 182, 184. The users 180 may utilize client devices, such as laptops, desktops, tablets, cellular phones, or other types of computers and commercially available wearable devices. The responsible parties may be kept updated regarding the events that occur subsequent to an automatic action executed by the digital manufacturing system in response to an anomaly. For example, if a machine was shut off in an automated action, then a message may be sent to inform the responsible party of such development.

The digital manufacturing system 100 can thus facilitate communication between manufacturing decision makers, such as one or more of the users 180, for manufacturing issues. In an example, the messages can be posted as a message stream on the user interface of a particular user. When the user logs on to the digital manufacturing system 100, the user is greeted by the message stream that allows the user to browse through the various posts. As mentioned above, the posts may be messages from other users or from the machines connected with the digital manufacturing system 100.

Solutions devised for various manufacturing problems encountered at the manufacturing plants 110*a-c* are stored to create a global knowledge base which may be subsequently used for predicting and solving manufacturing problems. This can be achieved, for example, via inter-communication between the database server 102, the application server 104 and the web server 106. In an example, the digital manufacturing system 100 keeps track of the various interactions that occur during a decision making process. Upon receiving the messages arising from the anomalies, the users 180 and/or the machines may take certain actions. Such actions may include further communications exchanged between the users and/or automated actions by machines. Information regarding such actions can be received at the database server 102 from the web server 106 and/or the application server 104. The database server 102 can be mined later, for finding solutions to similar problems, identifying parties responsible for resolving the issues and for training purposes.

Figure 2:
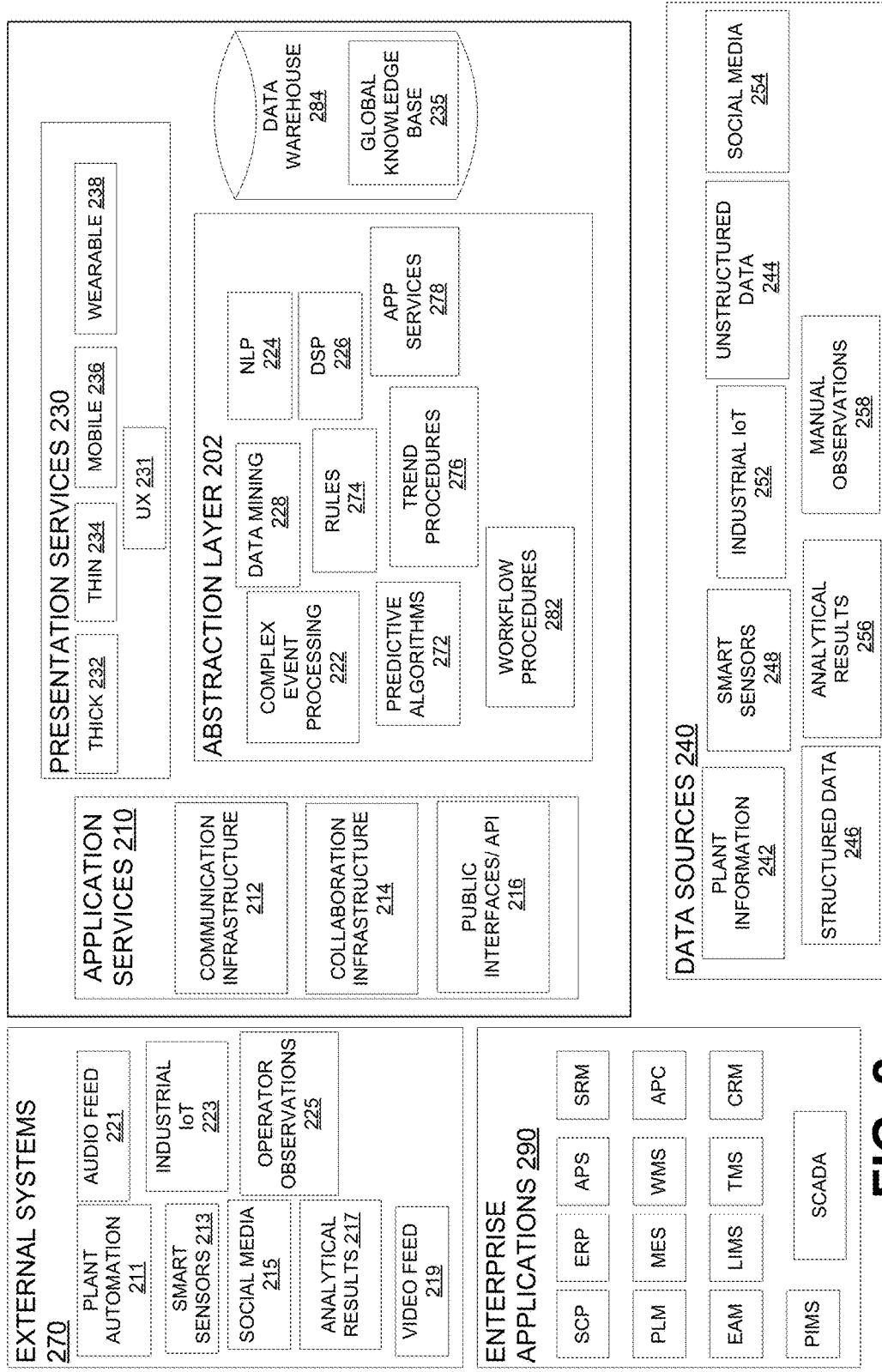
FIG. 2 an example architecture for the digital manufacturing system.

FIG. 2 show an architecture of the digital manufacturing system 100, according to an example. The architecture may include application services 210, abstraction layer 220 and presentation layer 230 which can be implemented on one or more of the database server 102, application server 104 and the web server 106. The database server 102 can receive, store and process data of various formats. The communication infrastructure 212 associated with the application services 210 enables the digital manufacturing system 100 to receive data from various data sources 240 such as plant information 242, unstructured data 244, structured data 246, smart sensors 248, industrial Internet of Things (IoT) 252, social media 254, analytical results 256 from the various applications used in the enterprise and manual observations 258 that may have been entered by the users 180 of the digital manufacturing system 100. The communication infrastructure 212 can include but is not limited to wired and wireless networks such as LANs, WANs, Internet, Wi-Fi, BLUETOOTH, and the like. The data sources 240 serve to generate various events that result in rules-based actions executed by one or more of the users 180 and the machines connected to the digital manufacturing system 100.

The instructions for complex event processing 222 may be stored in the storage medium 144 of the application server 104 and cause the processor 142 to access the data sources 240, process high-volume data including time series data and recognize conditions and execute corresponding actions specified by the rules 274. For example, as a manufacturing process occurs, the various data sources 240 connected with the process may be monitored and their data analyzed by trained classifiers 146 for identifying anomalies in real time. Anomalies can include data entries that are out of acceptable ranges for a given data set. Each data set of the plurality of data sources 240 may have its own acceptable ranges defined within the digital manufacturing system 100.

In an example, the acceptable ranges for values of entries in the data sets can be encoded within the rules 274. When an event causes a rule to be enforced, the actions associated with the rule are executed. Such actions can involve affecting the operation of one or more machines, sending messages to selected recipients, altering a business process and the like. The processor 142 may automatically select the recipients for the messages via the workflow procedures 282. The application services 210 includes collaboration infrastructure 214 such as but not limited to message boards, instant messages, emails and the like which allows the recipients to collaborate to resolve an anomaly. The digital manufacturing system 100 thus enables the users 180 to comply with the business processes within the enterprise.

Selection of recipients for messages can also occur via data mining procedures 228. For example, a rule can select certain personnel or machines as recipients by accessing a data warehouse 284 that may archive historical data. The recipients selected via data mining procedures 228 can be users who may have previously dealt with similar anomalies or machines that were able to respond to the anomaly.

The NLP (Natural Language Processing) procedures 224 can be executed by the application server 104 to format the messages. For example, when a message needs to be generated for information arising from a data source emitting unstructured data 244, the NLP procedures can be executed by the processor 142 to add context to the data thereby framing it in a human readable format. In another example, a message transmitted by a human user can be processed to identify data elements and to update the corresponding databases. In addition, some of the NLP and other message processing procedures may be executed by the web server 106 that transmits messages to the users. In an example, the web server may add mark up to the messages or process them so that they are streamed to a user's message feed.

The data mining procedures 228 can be further employed to access big data repositories such as a global knowledge base 235 stored on the data warehouse 284 to identify historical data associated with particular anomalies. Again, artificial intelligence procedures such as but not limited to, trained classifiers 146 can be used to identify historical data for particular anomalies. In an example, the processor 142 can execute trend procedures 276 in order to determine patterns in real-time data from the manufacturing plants 110a-c or to determine patterns in archived data stored in the data warehouse 284. Predictive algorithms 272 can be employed to predict events based on the trends.

The application services 210 may include public interfaces/APIs 216 (Application Programming Interfaces). Applications may be developed for the digital manufacturing system 100 and may be service oriented. The public interfaces 216 allow other systems to connect to applications in the digital manufacturing system 100.

The presentation layer 230 includes user interfaces 231 that display information on different client devices 182, 184. The digital manufacturing system 100 provides user interfaces that can be displayed on thick clients 232, thin clients 234, mobile devices 236 including tablets, smartphones and wearable devices 238 such as GOOGLE GLASS, smart watches and the like. The presentation layer 230 may also include user interfaces that can display rules and allow a user to modify rules 274, event processing 222 and modify other applications executed on the digital manufacturing system 100. In an example, the presentation layer 230 can be executed by the processor 162 of the web server 160 which can format the user interfaces 231 to suit a selected device for a particular user.

The communication and collaboration infrastructures 212, 214 may include a gateway to communicate and collect data from the external systems 270 which may include but are not limited to plant automation 211, smart sensors 213 in establishments outside of the manufacturing plants 110a-c, social media 215, industrial IoT (Internet of Things) 223, audio feed 221, video feed 219, operator observations 225 and analytical results 217. The digital manufacturing system 100 can be integrated with external enterprise applications 290 which include but are not limited to SCP (Secure Copy), ERP (Enterprise Resource Planning), SRM (Supplier Relationship Management), PLM (Product Lifecycle Management), MES (Manufacturing Execution System), WMS (Warehouse Management System), TMS (Training Management Systems), LIMS (Laboratory Information Management System), CRM (Customer Relationship Management), PIMS (Pharmacy Information Management Systems) and SCADA (Supervisory Control and Data Acquisition) thereby making use of the interfaces presented by such applications.

Figure 3:
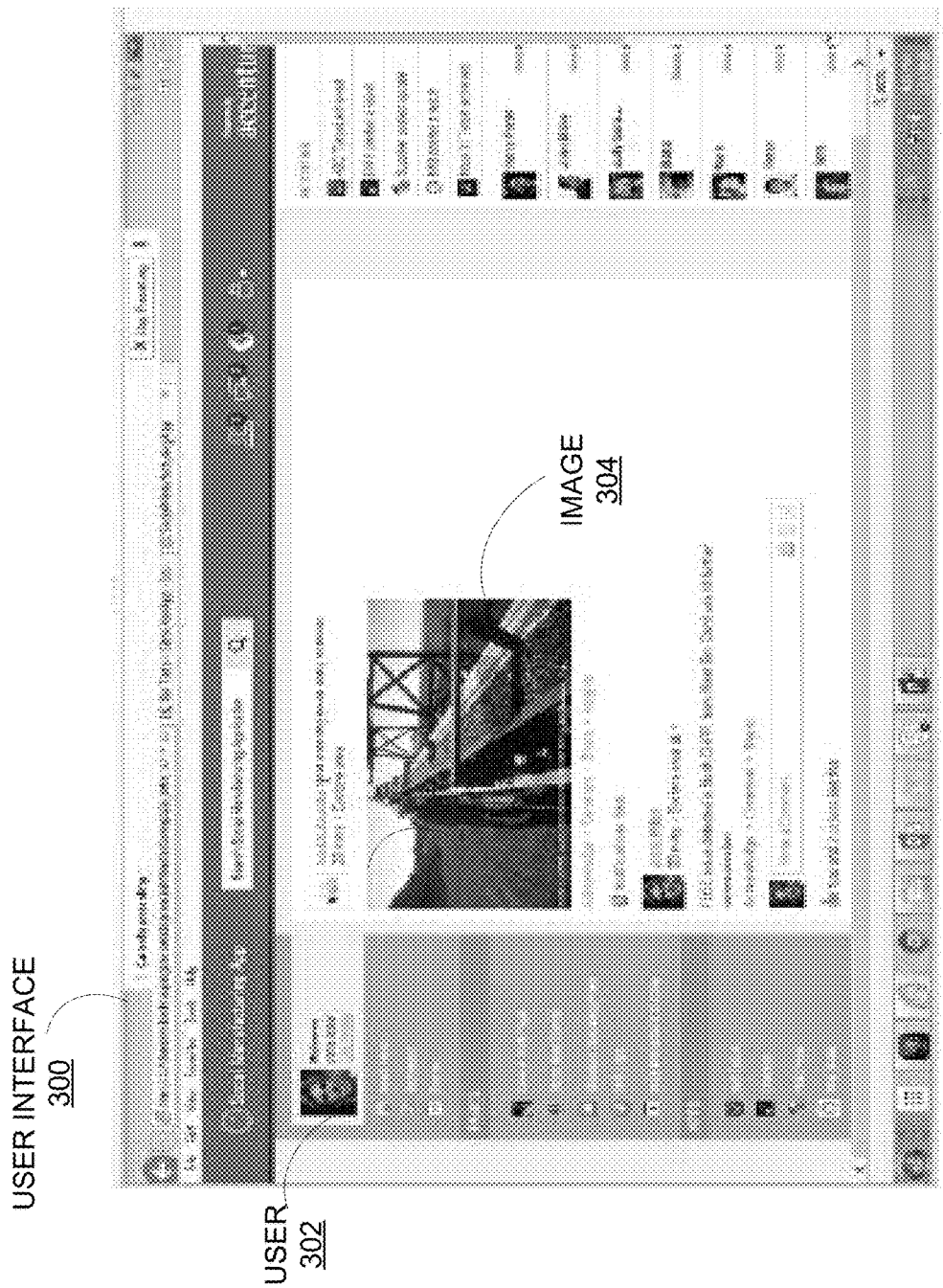
FIG. 3 an example of a user interface that illustrates a use case scenario.

FIG. 3 shows an example of a user interface 300 that illustrates a use case scenario wherein an anomaly is detected and automatic actions including transmission of messages are executed by the digital manufacturing system 100. In this case, the manufacturing plant includes a conveyer belt carrying coal that does not meet specifications. Therefore, a message is transmitted to the user 302, who is automatically selected based, for example, on the workflow procedures 282. The user interface 300 may display an image or a video stream 304 from a camera monitoring coal on a conveyer belt. The user 302 may be at a geographic location remote from the conveyer belt. A computer vision (CV) algorithm executed by the processor 142 within the digital manufacturing system 100 can determine the quality of the coal on the conveyer belt. When the size of the coal falls outside a predetermined acceptable range, the classifiers 146 which are trained to detect such anomalies, raise a smart event that results in certain actions based on the rules 274. For example, the user 302 may receive information regarding the anomaly in a message which may include details such as the size of the coal, the acceptable range and a source of the data such as the camera which recorded the video or the geographic location or plant information where the conveyer belt is located.

Upon examining the message, the user 302 can take further actions such as consulting a team at the remote location. In addition, other automatic actions such as stopping the conveyer belt can be or halting the delivery of the coal and sending automated emails can also be executed by the digital manufacturing system 100 based on one or more of the rules 274 and per the business processes from the workflow procedures 282.

Another example of integrating various systems and solving manufacturing problems performed by the digital manufacturing system 100 is now described. For example, the manufacturing plants 110a-c can be currently manufacturing pharmaceuticals and a new order is received requesting a shorter manufacturing time. A user responsible for the orders enters the request via a workflow procedure 282. Users 180 such as a planner and marketing manager interact with each other via the collaboration infrastructure 214 and process the order according to another stored workflow procedure 282. The digital manufacturing system 100 can interact with external enterprise applications 290. The interactions may include a customer relationship management that identifies the contact information for the planner and marketing manager.

Once production is started, plant information 242, smart sensor data 234, unstructured and structured data 244, 246 are collected to detect quality issues. If a smart event identifies a quality issue, it may trigger an appropriate action which may invoke rules and workflows for responding to the quality issue. The digital manufacturing system 100 may provide notifications to appropriate users to determine whether to shut down production and may include workflow to provide approvals for the shutdown. Notifications and approvals are facilitated through the systems 100 at various stages and from various stakeholders. This bypasses the manual interactions that are typically done which can save valuable production time. Also, the global knowledge base 235 in the data warehouse 284 may be queried manually by appropriate users 180 or it may be automatically tagged via the Complex Event Processing (CEP) instructions 222 by the digital manufacturing system 100 to find solutions. Through the digital manufacturing system 100 the interactions and actions are captured and archived which helps build the global knowledge base. Also, the global knowledge base 235 minimizes reliance on human memory or personal past experience to solve production issues. Also, the digital manufacturing system 100 can help connect people worldwide for coaching and can also outsource problem to external advisors.

Figure 4A:
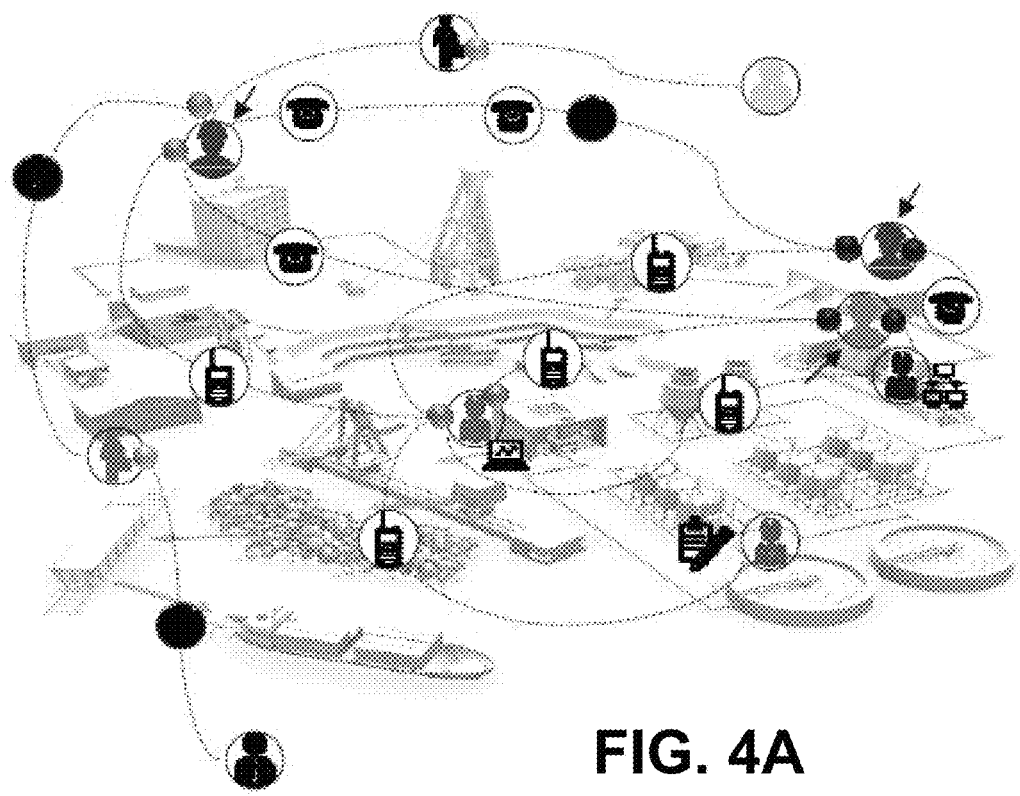
FIG. 4A shows an example of manufacturing plants and sites without the digital manufacturing system.

FIG. 4A shows an example of manufacturing plants 110a-c and sites without the digital manufacturing system 100. Multiple people within a plant communicate over multiple devices in a recursive and chaotic manner to resolve a product quality issue. The decision makers are the single point of failure in the decision making process which can cause a stoppage of production or inferior production quality. There is no knowledge base to query for production issues, and no digital collaboration between sites. Also, there is no technical means to capture and store decisions, events, etc. for future problem resolution.

Figure 4B:
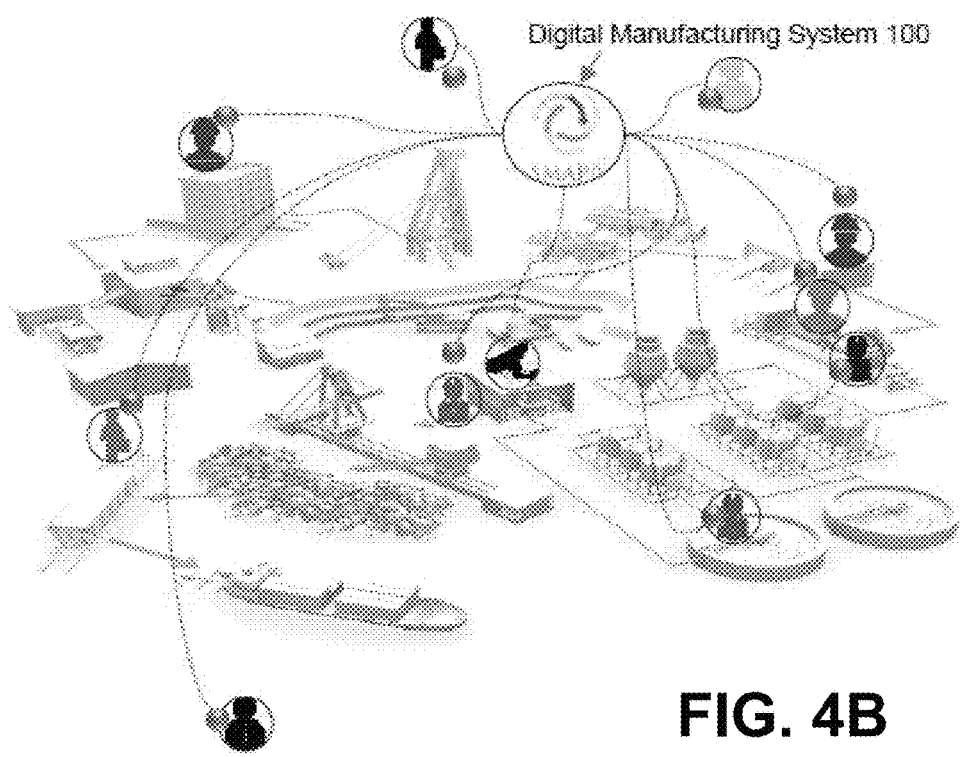
FIG. 4B shows an example of the manufacturing plants and sites within the digital manufacturing system.

FIG. 4B shows the manufacturing plants and sites with the digital manufacturing system 100. The digital manufacturing system 100 provides collaboration between machines, applications, and people in a unified and structured manner to resolve production issues. The decision makers and experts are available any time via the digital manufacturing system 100 and hence no single point of failure. The digital manufacturing system 100 can auto-initiate requests proactively by comparing issues at various sites and can also involve suppliers and experts automatically based upon historic user feedback stored in the data warehouse 284 on the issue from various sites. The events are contextualized in a knowledge base 235 on the data warehouse 284 maintained by the digital manufacturing system 100. The events may be chronologically ordered and when an issue appears the digital manufacturing system 100 can proactively tag the knowledge base to the issue while automatically notifying users.

Figure 5:
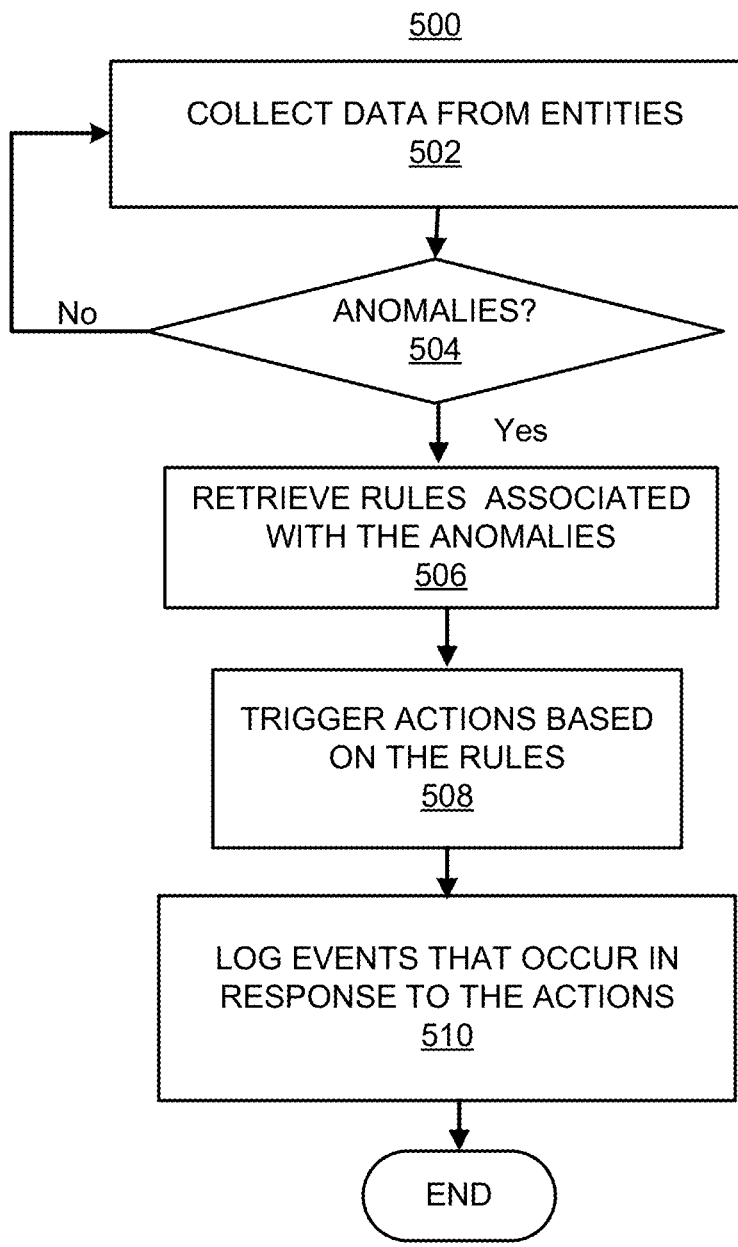
FIG. 5 is a flowchart that details an example of a method of collaboration between human users and machines associated with the digital manufacturing system.

FIG. 5 is a flowchart 500 that details an example of a method of collaboration between the users 180 and machines associated with the digital manufacturing system 100. The method begins at 502, wherein the data generated by the various entities associated with the digital manufacturing system 100 is collected. The entities can be the users 180 and equipment including machines, computers, sensors, controllers and other hardware used in the various manufacturing plants 110a-c and computers, client devices used in the business processes. The users 180 may be personnel associated with an manufacturing enterprise associated with the digital manufacturing system 100 and people who are connected with external organizations such as the clients, suppliers of the enterprise. The collected data can be activity logs of the various machines in the manufacturing plants 110a-c including logs of the various computer systems running the enterprise-wide applications used for manufacturing activity and business processes, communications exchanged by the users 180 and activity of the human users 180 on the digital manufacturing system 100. For example, if a user executes a particular action, then such activity is also received at 502. Accordingly, data of various formats as described herein is received at 502.

At 504, it is determined by the application server 104 if there are anomalies in the data. Data entries whose values lie out of predetermined ranges can be recognized as anomalies. The anomalies serve to detect situations that, if unchecked, may lead to disruptions in manufacturing processes. For example, in the use case scenario discussed above, early detection of the coal being out of the specification can lead to corrective actions being taken and to meeting a delivery deadline with a customer. It may be appreciated that the digital manufacturing system 100 receives data generated by the myriad users 180 and machines associated with a global manufacturing enterprise and analyzes the data to identify the anomalies. In an example, an anomaly may also be manually flagged by the users 180.

If it is determined at 504 that there are no anomalies in the received data, the method returns to receiving the data at 502. If it is determined at 504 that one or more anomalies exist in the received data, then the rules 275 associated with the anomalies are retrieved at 506. The actions are triggered at 508 based on the rules. Various actions that affect operation of the machines such as but not limited to automatically manipulating or shutting the machinery, and/or sending messages to automatically selected recipients can be triggered at 508. In an example, the anomalous data may be processed by NLP techniques to add additional information such as tags to add context. Furthermore, the presentation services may add markups and other information required to properly display the message on a recipient's respective platform. The various actions that are triggered in response to the anomaly are also logged at 510. The logs of activities or actions help track the various steps that are involved in a decision process and hence serve as a knowledge repository for future generations who may face a similar problem or the knowledge repository may also provide training.

Figure 6:
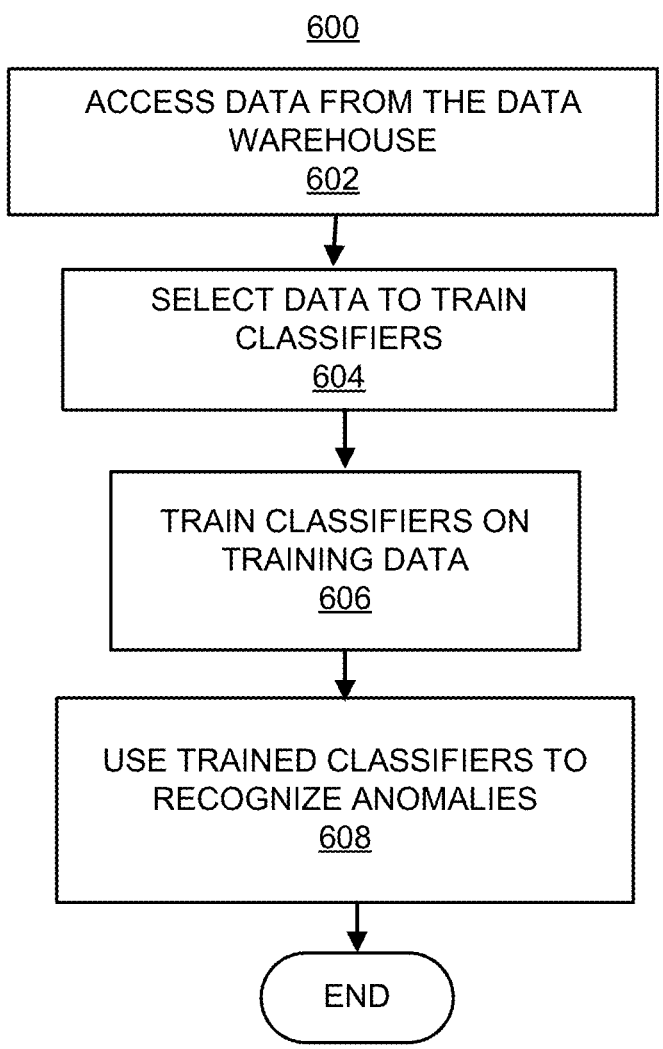
FIG. 6 is a flowchart that details one example of a method of recognizing anomalies.

FIG. 6 is a flowchart 600 that details one example of a method of recognizing anomalies in a large volume of data generated in the digital manufacturing system 100. The method begins at 602 wherein the data warehouse 284 which may be a repository of big data from the digital manufacturing system 100 is accessed. The data for training the classifiers 146 to recognize anomalies is collected at 604 from the data warehouse 284. The data warehouse 284 can store large volume of data generated by the various entities on the digital manufacturing system 100. For example, activity logs of the various equipment in the manufacturing plants, logistic data, business processes, messages exchanged between users on issues, notifications pushed by the digital manufacturing system 100 in various circumstances including text, image, audio, video data can be stored in the data warehouse 284 and portions of such stored data may be selected to train the classifiers 146. In an example, the data to train the classifiers can be labeled training data for supervised learning. In an example, the classifiers may be trained via unsupervised learning. The classifiers 146 are thus provided with the selected training data at 606. At 608, the trained classifiers are used to recognize anomalies in real time as a manufacturing process is executed.

Figure 7:
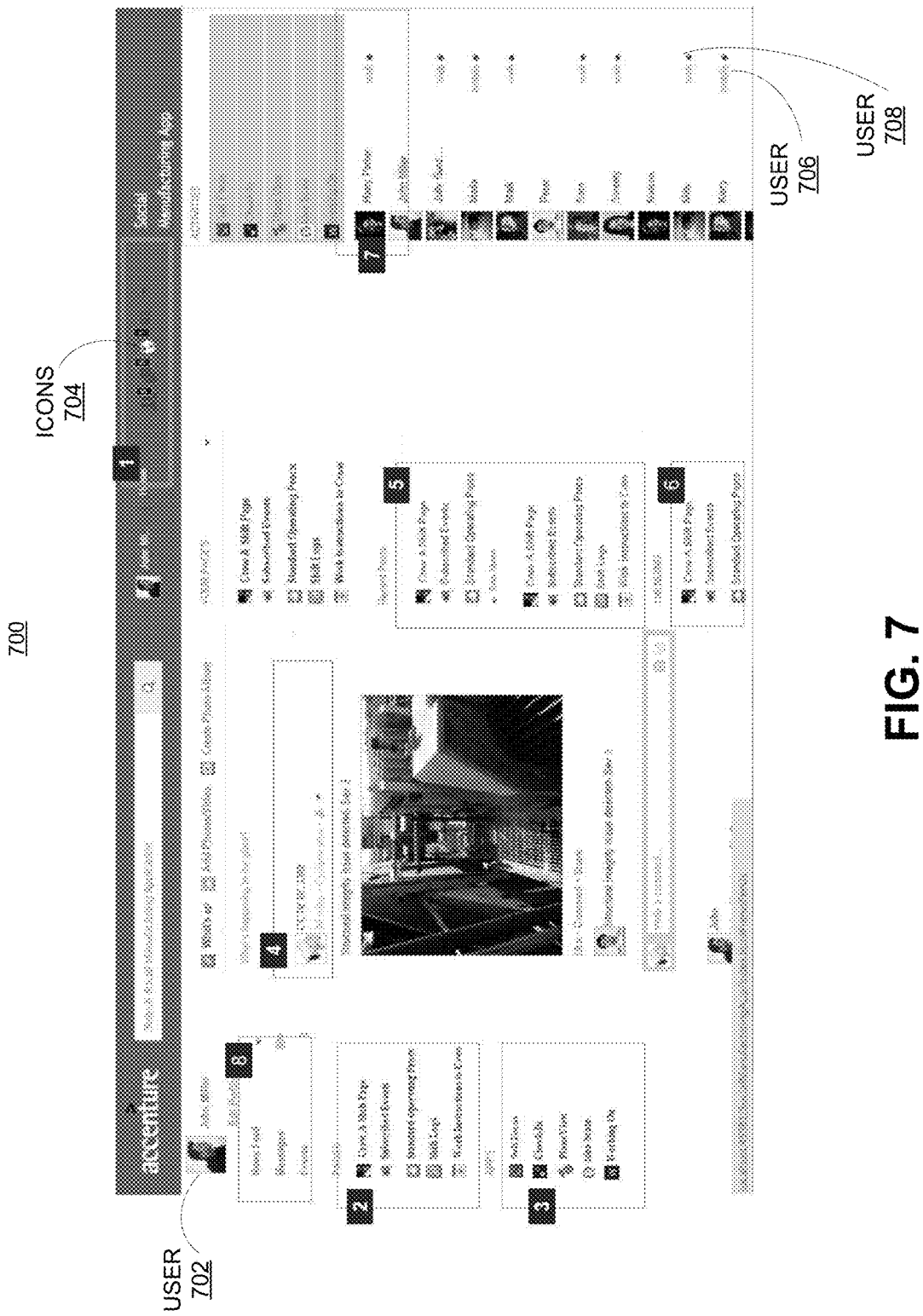
FIG. 7 shows another example of a user interface of the digital manufacturing system.

FIG. 7 shows another example of a user interface 700 of the digital manufacturing system 100. For example, the user interface 700 can be a customized home page or landing page for the user 702 in the digital manufacturing system 100. The different sections of the user interface 700 are labeled with numbers 1-8 and the information displayed therein relates to the user 702. A notification section 1 shows icons 704 for new notifications. Section 2 enables navigation to other sections such as but not limited to a crew shift page, subscribed events, standard operation procedures, shift logs, work instructions to the crew and the like. Section 3 of the user interface 700 is an application store that lists various applications accessible to the user 702 within the digital manufacturing system 100. Section 4 shows an activity stream for machines, sensors, users 180 and other entities associated with the digital manufacturing system 100. In FIG. 7, the activity stream displays a video stream from a camera monitoring a machine in a manufacturing plant. Section 5 shows portions of the digital manufacturing system 100 100 that received recent messages or posts. Again, as mentioned above, these messages or posts may be sent by the users 180, machines including manufacturing equipment or computers executing enterprise applications, and business processes subject to the rules 274. In an example, section 5 may also include predictive suggestions based on the content of the activity stream in Section 4. Access to the trending topics or areas on the digital manufacturing system 100 are provided at Section 6. The trends shown in Section 6 may be global trends based on the size of the enterprise associated with the digital manufacturing system 100. Section 7 enables on-the-spot collaboration between the users 180 of the digital manufacturing system 100. The modalities of collaboration may also be indicated in Section 7. Thus, the user 706 is indicated as being available for collaboration on the Internet (web) while the user 708 is indicated as being available for collaboration on a mobile platform. Section 8 of the user interface 700 provides access to the personalized events and messages of the user 702.

Figure 8:
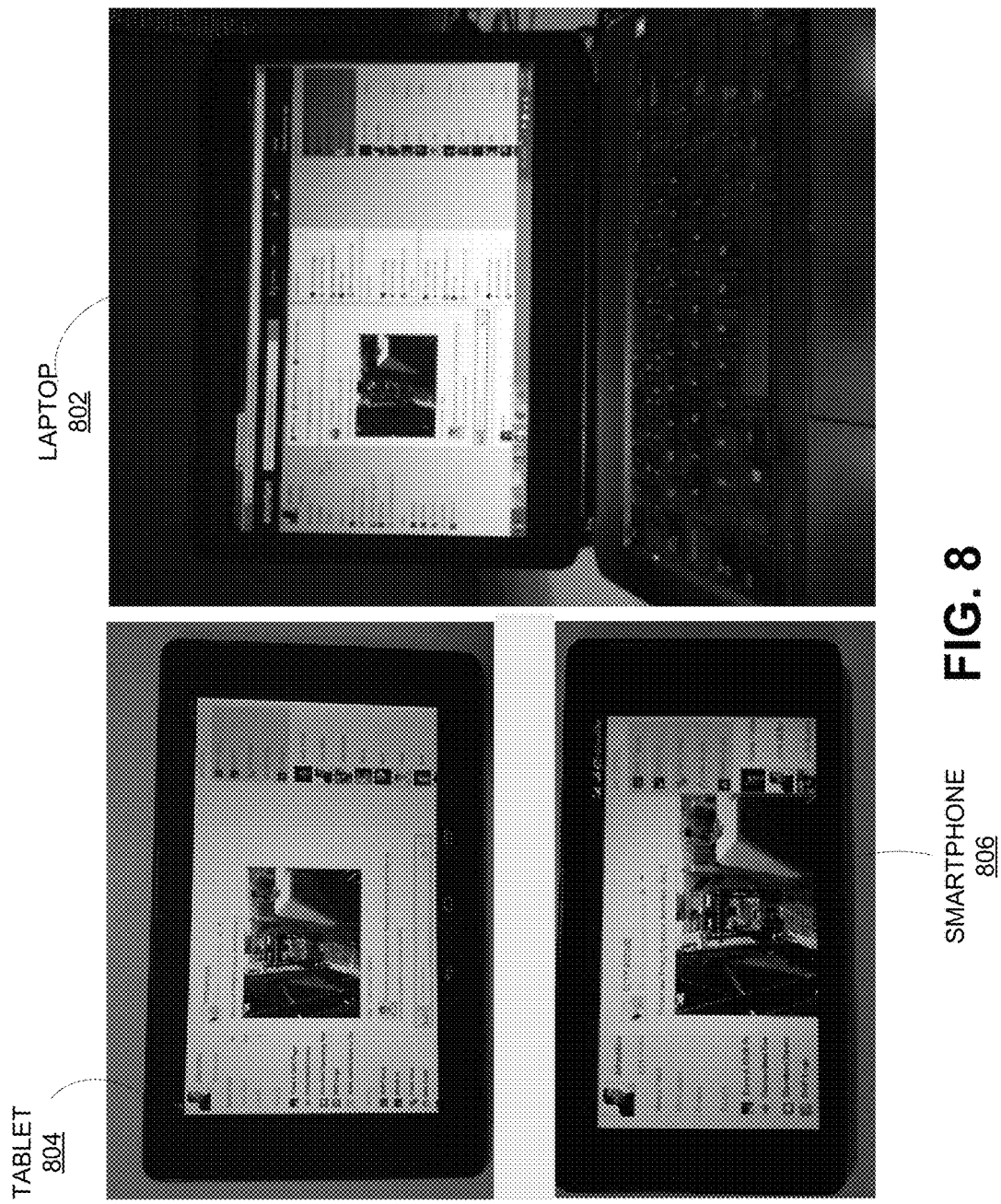
FIG. 8 shows the user interface displayed on thick and thin clients running various platforms.

FIG. 8 shows the user interface 700 displayed on thick and thin clients running various platforms. The user interface 700 maintains a consistent "look and feel" across a laptop 802, a tablet 804 and a smartphone 806. A user is therefore enabled to access the digital manufacturing system 100 from any location that may have data connectivity and hence be available for collaboration whenever issues may arise.

FIG. 9 illustrates a computer system 900 that may be used to implement the digital manufacturing system 100. More particularly, one or more of the database server 102, the application server 104, the web server 106 and one or more of the client devices employed by the users 180 such as desktops, laptops, smartphones, tablets, wearables may have the structure of the computer system 900. The computer system 900 may include additional components not shown and that some of the components described may be removed and/or modified.

The computer system 900 includes processor(s) 902, such as a central processing unit, ASIC or other type of processing circuit, input/output devices 912, such as a display, mouse keyboard, etc., a network interface 904, such as a Local Area Network (LAN), a wireless 802.11x LAN, a 3G or 4G mobile WAN or a WiMax WAN, and a computer-readable medium 906. Each of these components may be operatively coupled to a bus 908. The computer readable medium 906 may be any suitable medium which participates in providing instructions to the processor(s) 902 for execution. For example, the computer readable medium 906 may be non-transitory or non-volatile medium, such as a magnetic disk or solid-state non-volatile memory or volatile medium such as RAM. The instructions or modules stored on the computer readable medium 906 may include machine readable instructions 964 executed by the processor(s) 902 to perform the methods and functions of the digital manufacturing system 100.

The digital manufacturing system 100 may be implemented as software stored on a non-transitory computer readable medium and executed by one or more processors. For example, the computer readable medium 906 may store an operating system 962, such as MAC OS, MS WINDOWS, UNIX, or LINUX, and code 964 for the digital manufacturing system 100. The operating system 962 may be multi-user, multiprocessing, multitasking, multithreading, real-time and the like. For example, during runtime, the operating system 962 is running and the code for the digital manufacturing system 100 is executed by the processor(s) 902.

The computer system 900 may include a data storage 910, which may include non-volatile data storage. The data storage 910 stores any data used by the digital manufacturing system 100. The data storage 910 may be used to store real-time data from the manufacturing plants 110a-c or archived data from the machines of the digital manufacturing system 100 and may be hosted by separate database servers.

The network interface 904 connects the computer system 900 to internal systems for example, via a LAN. Also, the network interface 904 may connect the computer system 900 to the Internet. For example, the computer system 900 may connect to web browsers and other external applications and systems via the network interface 904.

What is claimed is:

1. A digital manufacturing system comprising:
one or more processors; and
a non-transitory data storage comprising instructions that cause the processors to:
receive messages from senders on the digital manufacturing system, the senders comprising users and machines associated with the digital manufacturing system;
access activity logs of the users and the machines;
identify anomalies from data in the activity logs of the users and the machines;
retrieve rules associated with the anomalies, the rules specifying automatic actions to be triggered in response to the anomalies;
initially affect operation of at least one of the machines by triggering the automatic actions based on the rules,
then automatically notify selected users regarding statuses of the automatic actions affecting the operation of the at least one machine;
log events occurring in response to the automatic actions to a data warehouse; and
enable generation of a user interface customized for a user of the digital manufacturing system, the user interface displaying messages generated by users and machines of the digital manufacturing system.

2. The digital manufacturing system of claim 1, wherein the automatic actions comprise transmitting messages and the instructions to trigger the automatic actions further comprise instructions that cause the processors to:
automatically identify recipients for messages delivering information regarding the anomalies, the identified recipients comprising at least the users;
automatically generate messages to the recipients; and
transmit the messages to the recipients.

3. The digital manufacturing system of claim 1, the processers are further to:
cause the messages from the senders to be displayed in respective user interfaces of the recipients.

4. The digital manufacturing system of claim 1, further comprising instructions that cause the processors to:
provide updates to responsible parties regarding status of the automatic actions.

5. The digital manufacturing system of claim 1, wherein the instructions to identify anomalies cause the processors to:
train classifiers to recognize the anomalies.

6. The digital manufacturing system of claim 5, wherein the instructions to identify the anomalies cause the processors to:
employ the trained classifiers to examine the activity logs of the users and the machines.

7. The digital manufacturing system of claim 1, wherein the instructions to generate the messages further cause the processors to:
format data from the activity logs of the machines with mark up.

8. The digital manufacturing system of claim 7, wherein the activity logs comprise one or more of structured data, unstructured data and relational databases.

9. The digital manufacturing system of claim 1, wherein the machines comprise computers executing applications.

10. The digital manufacturing system of claim 9, wherein the activity logs comprise logs of the applications being executed on the computers.

11. The digital manufacturing system of claim 1, the processors are further to:

analyze the anomalies, the automatic actions and the events to determine trends.

12. The digital manufacturing system of claim 1, wherein the digital manufacturing system is implemented in a manufacturing industry comprising a plurality of plants located at disparate geographic locations.

13. A method, comprising:
accessing data repositories storing archived data emitted by entities of a manufacturing enterprise, the entities comprising users and machines associated with the manufacturing enterprise;
selecting portions of archived data to train classifiers to be employed to identify anomalies in real-time data emitted by the entities;
training the classifiers on the selected portions of the archived data;
identifying, by the trained classifiers, anomalies in the real-time data; and
retrieving rules associated with the anomalies, the rules specifying automatic actions to be triggered in response to the anomalies;
initially triggering the automatic actions based on the rules, the triggering including executing the automatic actions that affect operation of at least one of the machines, and
then automatically notifying selected users regarding statuses of the automatic actions on affecting the operation of the at least one machine; and
enable generating a user interface customized for a user of the digital manufacturing system, the user interface displaying messages generated by users and machines of the digital manufacturing system.

14. The method of claim 13, further comprising:
logging events occurring in response to the automatic actions to the data repositories.

15. The method of claim 13, wherein the archived data comprises labeled data, and training the classifiers further comprises:
training the classifiers via supervised learning.

16. The method of claim 13, wherein triggering the automatic actions further comprises:
automatically identifying recipients for messages comprising information regarding the anomalies.

17. The method of claim 16, further comprising:
generating the messages comprising information regarding the anomalies to the recipients; and
transmitting the messages to the recipients.

18. The digital manufacturing system of claim 1, wherein the instructions for enabling generation of the user interface further comprise instructions that cause the processor to:
enable display of current activity streams from equipment monitoring the machinery of the digital manufacturing system; and
include predictive suggestions based on content of the activity stream.

* * * * *